(12) United States Patent
Brookes et al.

(10) Patent No.: US 7,711,535 B1
(45) Date of Patent: May 4, 2010

(54) SIMULATION OF HARDWARE AND SOFTWARE

(75) Inventors: Peter Brookes, Reading (GB); Andrew Hall, High Wycombe (GB); Nigel Gray, High Wycombe (GB)

(73) Assignee: Altera Corporation, San Jose, CA (US)

( * ) Notice: Subject to any disclaimer, the term of this patent is extended or adjusted under 35 U.S.C. 154(b) by 640 days.

(21) Appl. No.: 10/618,284

(22) Filed: Jul. 11, 2003

(51) Int. Cl.
*G06F 17/50* (2006.01)

(52) U.S. Cl. ...................................................... 703/14

(58) Field of Classification Search .................... 703/14
See application file for complete search history.

(56) References Cited

U.S. PATENT DOCUMENTS 6,389,379 B1 * 5/2002 Lin et al. ...................... 703/14

OTHER PUBLICATIONS

Kim et al. "An Integrated Hardware-Software Cosimulation Environment with Automated Interface Generation" 1996. IEEE.*
Kim et al. "Combined Data-Driven and Event-Driven Scheduling Technique for Fast Distributed Cosimulation", IEEE 2002.*
Ghosh et al. "A Hardware-Software Co-simulator for Embedded System Design and Debugging", ACM 2001.*

* cited by examiner

*Primary Examiner*—Kamini S Shah
*Assistant Examiner*—Saif A Alhija
(74) *Attorney, Agent, or Firm*—Townsend and Townsend and Crew LLP

(57) ABSTRACT

A method and apparatus are provided to allow co-verification of hardware and software elements asynchronously from a programmable logic device (PLD).

41 Claims, 4 Drawing Sheets

SIMULATION OF HARDWARE AND SOFTWARE

TECHNICAL FIELD OF THE INVENTION

This invention relates to the field of digital system design verification. In particular, the invention relates to optimising the speed of simulation of a digital system design that features both software and hardware components, providing a method of allowing a C model to control the simulation in the HDL environment and allowing the simulation of interactive programs.

BACKGROUND OF THE INVENTION

A large number of the digital systems being designed today are task-specific systems that consist of standard or custom hardware and standard or custom software.

Some systems have a predominately software element; in that most of the design effort is spent implementing the system in software. Typically, this software is implemented on standard or previously designed hardware.

Other systems are hardware dominant; in that most of the design effort is spent implementing the system in programmable logic devices (PLDs) or application specific integrated circuits (ASICs).

In either case where hardware or software dominates, there are a variety of tools that can be used by the designer to validate the system and ensure that it is operating correctly. In the case of a software dominant system, debugger and other related software tools could be used. In the case of a hardware dominant system, hardware emulation or simulation could be used.

The systems that are the most difficult to validate are those that are neither hardware nor software dominant, where both parts play an important role in the success of the system. Often, the hardware and software are initially developed separately with each part being tested independently of the other. The hardware is tested using a hardware simulator or emulator. The software is validated using an instruction set simulator on a computer. Typically, an instruction set simulator will run at speeds that are several orders of magnitude higher than in a hardware simulator.

Once both the hardware and software have been verified separately, the two are co-simulated. That is, a simulation is carried out where the software runs on a simulation of the prototype hardware.

Due to the much lower speed of hardware simulation, this co-simulation is considerably slower than instruction set simulation.

SUMMARY OF THE INVENTION

A method is provided that provides fast software simulation within a hardware description language (HDL) simulation environment.

According to a first aspect of the present invention, a method of co-verifying a hardware and software system is provided that comprises simulating an embedded system (including any processors) in a separate thread within a HDL simulation environment.

The embedded system is implemented in a C model that runs asynchronously to the HDL design, which allows the software executing on the embedded processor to run ahead of the HDL simulation. This allows fast simulation of processor instructions within the embedded system model.

According to an embodiment of the present invention, the C model is synchronised with the HDL simulation via a reference clock, which limits the number of microprocessor clock periods executed per reference clock period.

According to a second aspect of the present invention, a method of allowing the C model to control the HDL simulation is provided that comprises: running a macro in the HDL simulation to set up a TCP/IP socket, connecting the C model to the socket, allowing the C model to control the HDL simulation.

According to a third aspect of the present invention, a method for providing an IO interface to a simulation model to allow the simulation of interactive programs is provided that comprises: simulating an embedded input/output device within the simulation model; connecting the model of the embedded input/output device to a terminal emulator over TCP/IP; and running a program that interacts with the user via the terminal emulator.

DETAILED DESCRIPTION OF THE PREFERRED EMBODIMENTS

In accordance with a first aspect of the invention, fast simulation of software within a hardware description language (HDL) simulation environment is achieved by implementing any tightly coupled processors and peripheral devices within a single C/C++ model. Bus functional models are used to provide an interface between the C/C++ model and more loosely coupled hardware components simulated in HDL.

Although the embodiment of the invention described below refers to embedded processors and embedded peripherals, it will be appreciated that the invention is also applicable to processors and peripherals that are not embedded. It will also be appreciated that the references to HDL and C/C++ models are not to be considered restrictive. Other programming languages, such as Java, assembly language, or Visual Basic could be used in accordance with the invention.

Modelling techniques that are covered by the term "HDL" include all hardware description languages, such as Verilog™ and VHDL. However, the present invention should not be limited to these examples of programming language and hardware description language.

The C model is implemented such that both the embedded processor and all embedded peripherals to the embedded processor are modelled in C/C++. Implementing the tightly coupled aspects of the system (i.e., processor, any peripherals with which the processor interacts and internal memory interfaces) in C/C++ allows the embedded processor and peripherals to interact within a single C/C++ model, which means that communication between the C model and the HDL model is reduced, dramatically improving performance over an implementation which contains multiple interfaces between blocks of HDL and C/C++.

Figure 1:
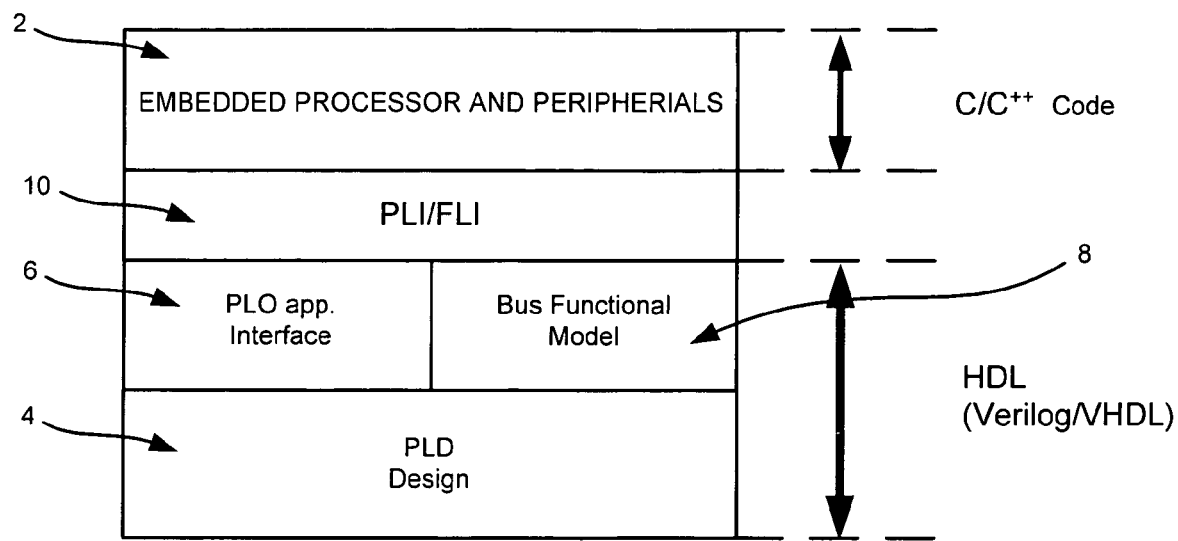
FIG. 1 shows the interface between a C model and the HDL simulation in accordance with a first aspect of the invention.

FIG. 1 shows an example of the interface between a C model and the HDL simulation in accordance with the first aspect of the invention. As described above, the embedded processor and peripherals 2 are implemented in C/C++ code, the PLD design 4, PLD application interface 6 and the bus functional model 8 are modelled in a hardware description language such as Verilog or VHDL.

The two simulation models communicate over a programming language interface (PLI) or a foreign language interface (FLI) 10.

It should be noted that although only a single PLD design is illustrated in FIG. 1, any number of PLD/ASICs could be modelled in the HDL simulation.

The use of a bus functional model 8 has been extended so that it is driven by the C model of the embedded processors and peripherals, instead of script files, as is conventional. A C/C++ model-to-PLD bridge, that synchronises transactions across clock domains, is implemented such that the slave is modelled in C/C++ code with the master modelled in HDL. The situation is reversed for the PLD-to-C/C++ model bridge, with the slave in HDL and the master implemented in C/C++.

Further in accordance with the first aspect of the present invention, the C/C++ model of the embedded processor and peripherals runs asynchronously to the HDL simulation.

Figure 2:
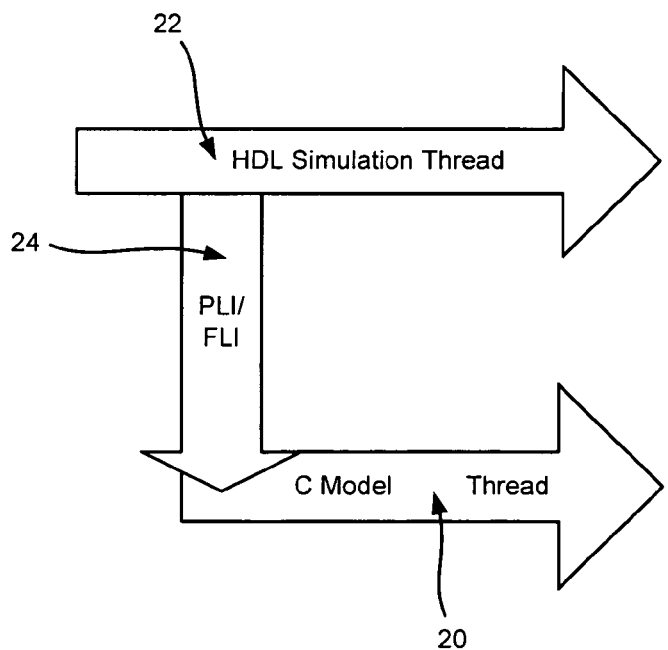
FIG. 2 shows the use of multiple threads in simulating the hardware components in accordance with a first aspect of the invention.

FIG. 2 shows the use of multiple threads in simulating the hardware components of the system. The C/C++ model 20 is in a separate thread of execution on the host machine to the HDL simulation 22. The C/C++ model thread 20 is spawned within a PLI/FLI function 24.

Synchronisation between the C model 20 and the HDL simulation 22 can be achieved through an HDL parameter that specifies a maximum number of processor clock cycles simulated in the C/C++ model 20 per reference clock cycle.

Figure 3:
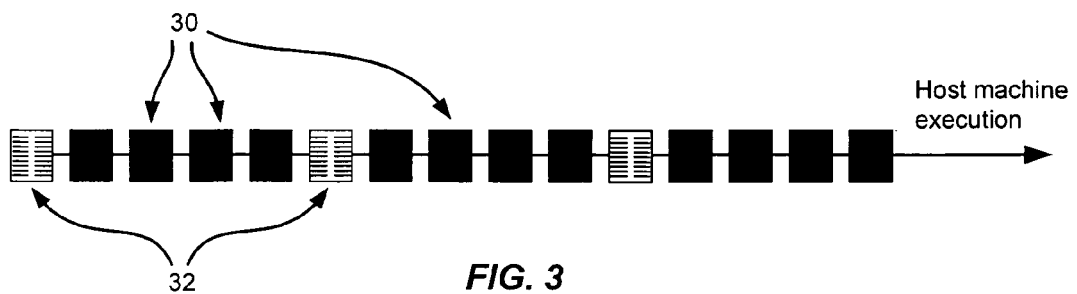
FIG. 3 shows the execution of the co-verification system running on a host machine with a single processor.

FIG. 3 shows the execution of the co-verification system running on a host machine with a single processor. With the parameter set to 4, the C/C++ model is advanced by 4 processor clock periods for each reference clock period in the HDL simulation thread.

Shaded blocks 30 in FIG. 3 represent a single processor clock period in the C/C++ model thread while the unshaded blocks 32 represent a single reference clock cycle in the HDL simulation thread.

Figure 4:
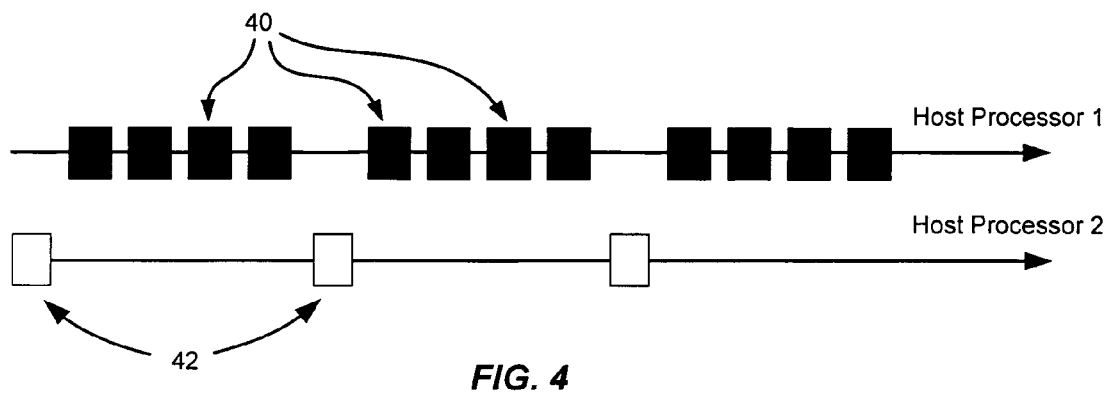
FIG. 4 shows the execution of the co-verification system running on a host machine with two processors.

FIG. 4 shows the execution of the co-verification system running on a host machine with two processors. The first processor runs the C model and the second processor runs the HDL simulation. Again, with the parameter set to 4, the C model is advanced by 4 processor clock periods on the first processor, before the HDL simulation thread is advanced by a single reference clock period on the second processor.

Shaded blocks 40 in FIG. 4 represent a single processor clock period in the C/C++ model thread while the unshaded blocks 42 represent a single reference clock cycle in the HDL simulation thread.

Figure 5:
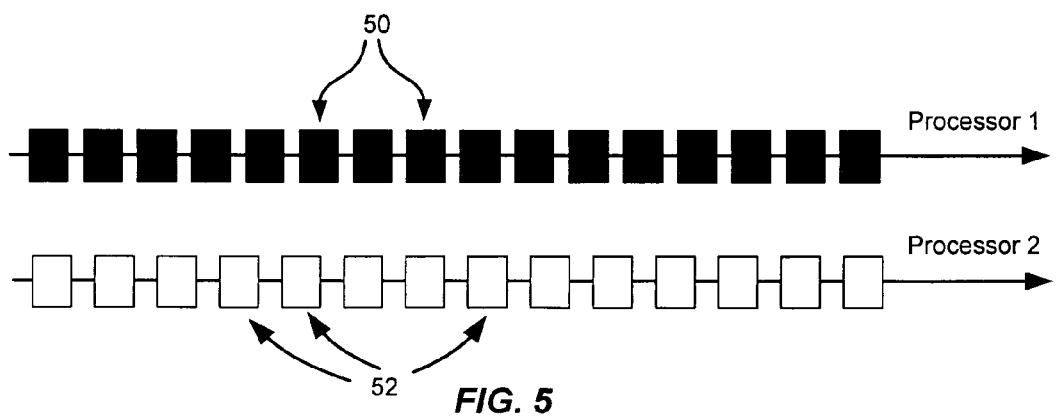
FIG. 5 shows the simulation of a C model thread and a HDL simulation thread asynchronously using the thread scheduling of the host machine.

In a multi-processor host machine, a mode is provided, selectable through an HDL parameter, which simulates the C/C++ model thread and the HDL simulation thread asynchronously using the thread scheduling of the host machine. This mode is illustrated in FIG. 5.

Typically, in this mode, hundreds to thousands of processor clock cycles in the C/C++ model thread are executed per reference clock cycle.

To avoid the insertion of spurious wait cycles when C/C++ model-to-PLD interactions occur, the threads are synchronised around such interactions. In this case, the performance gain of the system is balanced against a loss of repeatability of simulation.

It should be noted that since the C/C++ model thread contains both the processor and peripherals, and combined with the multi-threaded nature of the implementation and the thread synchronisation, this provides a suitable environment to allow code running on the model of the embedded processor in the C/C++ model to run ahead of the HDL simulation very quickly. This is particularly advantageous when executing large fragments of software on the embedded processor without interaction with the PLD, such as running an Operating System application.

The implementation described allows the simulation of over three hundred thousand instructions per second within a HDL simulation environment on a standard home computer.

According to the second aspect of the present invention a software/hardware co-simulation environment is presented that provides full debug control (watchpoint, breakpoint, single stepping, etc.) over the software simulated on the embedded processor in the C/C++ model, whilst remaining in an HDL simulation environment. A high level of visibility of the C/C++ model-to-PLD interactions and/or software/hardware interactions is achieved.

Figure 6:
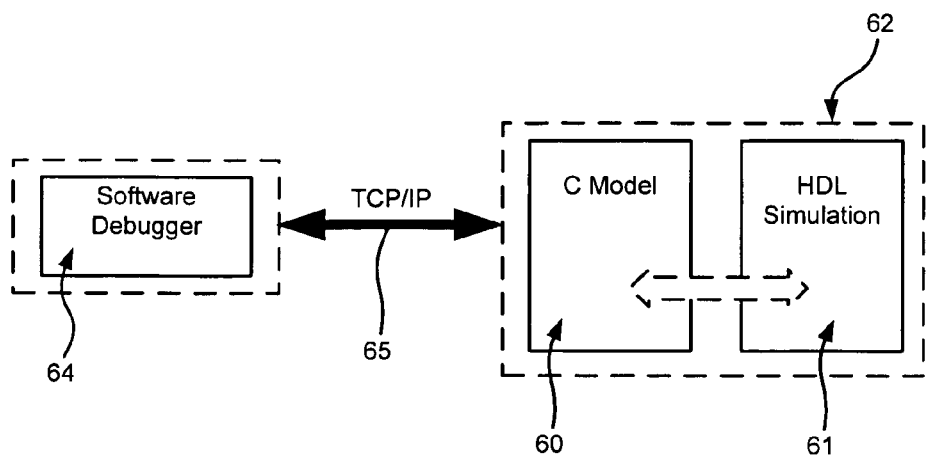
FIG. 6 illustrates a software debugger interfacing with a HDL simulation environment over a TCP/IP connection.

FIG. 6 shows a software debugger interfacing with the HDL simulation environment over a TCP/IP (Transmission Control Protocol/Internet Protocol) connection. It will be appreciated that any inter-process communication protocol, such as pipes, or file-based transfer, could be used in place of TCP/IP. The C/C++ model 60 and the HDL simulation 61 are implemented in the same process 62 so that communication between the HDL simulation 61 and the C/C++ model 60 can be most efficient. Such communication can be (but is not limited to) bus transactions, IO pin changes or interrupt signals.

Communications between the software debugger 64 and the C/C++ model 60 (represented by arrow 65) will generally be less host processor intensive than any HDL-to-C/C++ model communications (represented by the dotted arrow). Therefore, the software debugger 64 and C/C++ model 60 communications are more suitable to be implemented using inter-process communication protocols, such as TCP/IP.

Figure 7:
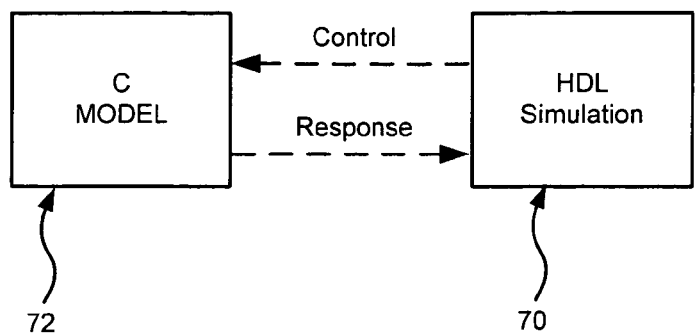
FIG. 7 shows conventional intra-process communication between a C model and a HDL simulation.

Conventionally, any HDL simulator to C/C++ model communication, whether implemented over a programming language interface (PLI) or foreign language interface (FLI), results in the C/C++ model effectively being a slave to the HDL simulator. This is illustrated in FIG. 7. The HDL simulation 70 sends control commands to the C/C++ model 72, to which the C/C++ model 72 responds. This means that the HDL simulator governs control of the C/C++ model; the C/C++ model is only able to influence execution using control requests as a response. Consequently, if the HDL simulation is paused—through a user or C/C++ model request—only the HDL simulator can resume overall simulation.

Figure 8:
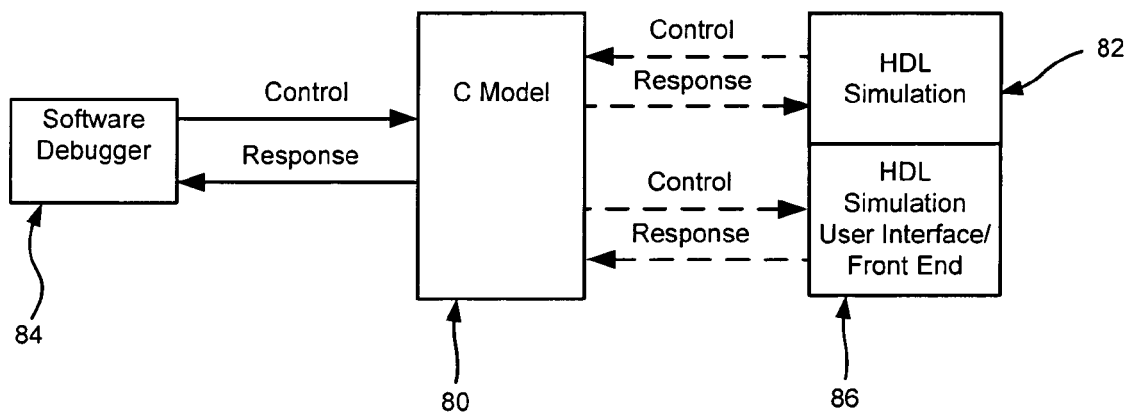
FIG. 8 illustrates a software debugger interfacing with a C model in accordance with the second aspect of the present invention.

FIG. 8 illustrates the system according to the second aspect of the present invention. The C/C++ model 80 is implemented within the same process as the HDL simulation 82. The HDL simulation 82 can send control commands to the C/C++ model 80 using an intra-process protocol (represented by the dashed arrows). The C/C++ model 80 is able to respond using the same protocol. A software debugger 84 and the C/C++ model 80 communicate over an inter-process communication protocol (represented by the solid arrows), such as TCP/IP. The software debugger 84 can send control commands to the C/C++ model 80, to which the C/C++ model 80 can respond.

With the software debugger 84 attached to the C/C++ model 80, the software debugger 84 has no knowledge of whether the C/C++ model 80 is attached to the HDL simulation 82 (and does not need to have such knowledge). Control of the C/C++ model 80 from the software debugger 84—in terms of running, single-steps etc.—requires the C/C++ model 80 to have control over the HDL simulation 82. As outlined above, this control cannot be achieved over a FLI or PLI.

Therefore, in accordance with the invention, the C/C++ model 80 communicates with a HDL simulation user interface/front end 86 using an inter-process communication protocol, such as TCP/IP. This allows the C/C++ model 80 to send control commands to the HDL simulation user interface 86. The HDL simulation front end 86 is used to run a macro, setting up a listening TCP/IP socket. When simulating an HDL design, the C/C++ model 80 connects to this socket to allow it to start/resume the HDL simulation 82. Thus, when the software debugger 84 issues a start command, the C/C++ model 80 uses the TCP/IP link to the HDL simulation front end 86 in order to resume HDL simulation 82. When a stop command is issued from the software debugger 84, the C/C++ model 80 can request simulation stop via the normal intra-process communication.

Figure 9:
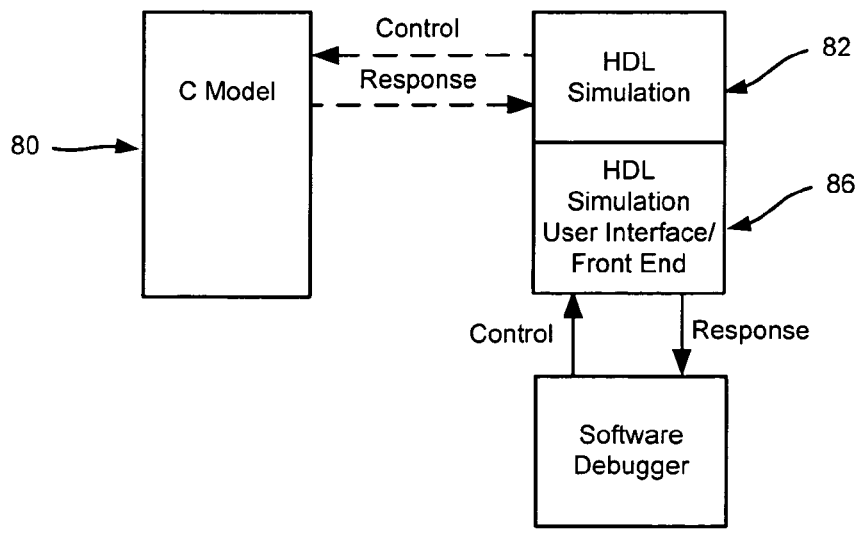
FIG. 9 illustrates a software debugger interfacing directly with the HDL simulation in accordance with the second aspect of the present invention.

FIG. 9 illustrates an alternative system according to the second aspect of the present invention. Again, the C/C++ model 80 is implemented within the same process as the HDL simulation 82. The HDL simulation 82 can send control commands to the C/C++ model 80 using an intra-process protocol (represented by the dashed arrows). The C/C++ model 80 is able to respond using the same protocol.

In accordance with the invention, the software debugger 84 communicates with a HDL simulation user interface/front end 86 using an inter-process communication protocol, such as TCP/IP. This allows the software debugger 84 to send control commands to the HDL simulation user interface 86. The HDL simulation front end 86 is used to run a macro, setting up a listening TCP/IP socket. When simulating an HDL design, the software debugger 84 connects to this socket to allow it to start/resume the HDL simulation 82. Thus, when the software debugger 84 issues a start command over the TCP/IP link to the HDL simulation front end 86, the HDL simulation 82 is resumed.

The software debugger 84 can also indirectly control the C/C++ model 80 through communications over TCP/IP to the HDL simulation front end 86, and then from the HDL simulation 82 to the C/C++ model 80 using an intra-process communication protocol.

According to the third aspect of the present invention, a method for providing an IO interface to a simulation model to allow the simulation of interactive programs is provided.

Figure 10:
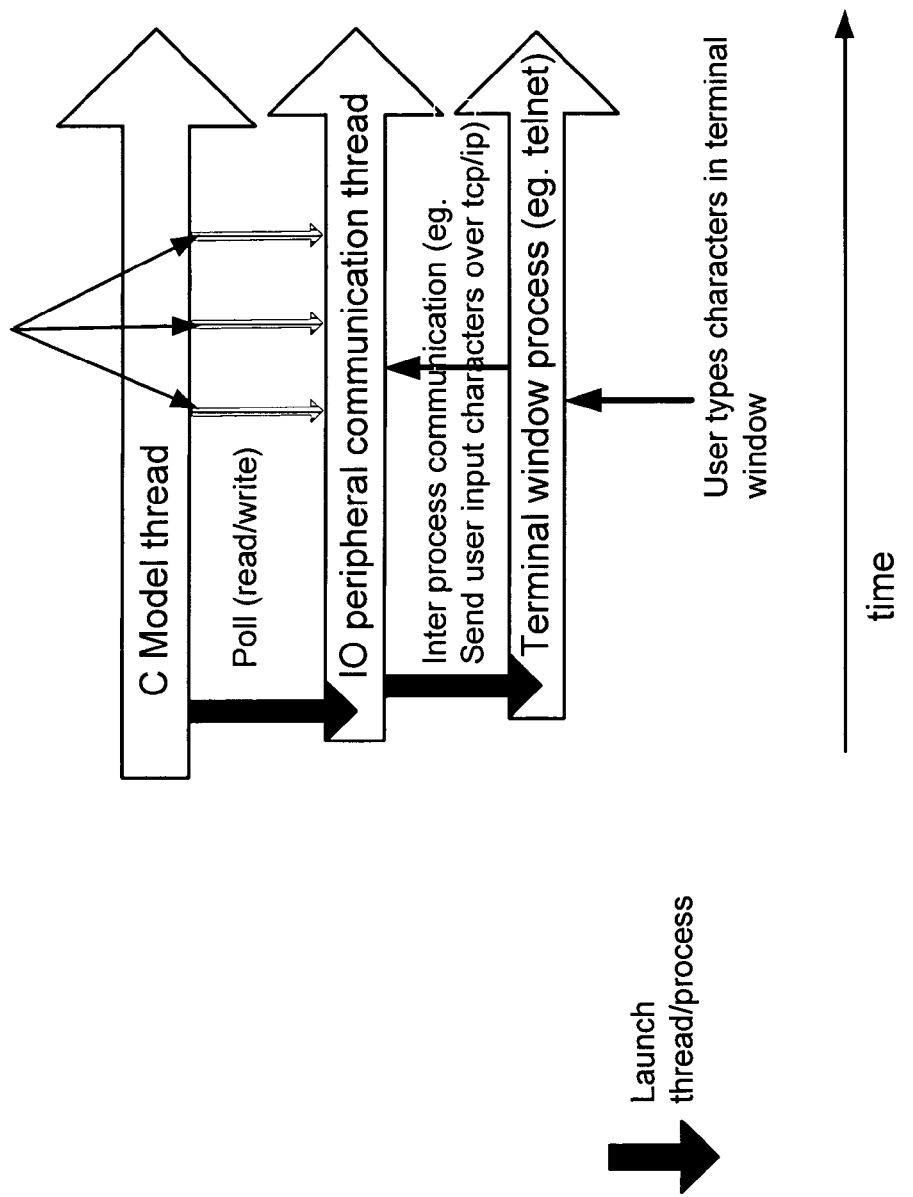
FIG. 10 illustrates an exemplary method for providing IO interface to a simulation model to allow the simulation of interactive programs according to a third aspect of the present invention.

As shown in FIG. 10, an IO based peripheral device, such as an embedded UART (universal asynchronous receiver-transmitter), is connected within the simulation model to a terminal emulator over TCP/IP or other inter-process communications protocol or technique (e.g., pipes, file transfer). FIG. 10 illustrates the connection of an input/output peripheral device to a terminal emulator using an inter-process communications link, such as the preferred TCP/IP link. The C/C++ model processing thread communicates with the I/O device processing thread within the simulation model.

The I/O device is connected to a terminal emulator, such as telnet, using the TCP/IP link. The terminal emulator is used to receive character, and other instruction, inputs from a user. The user thereby makes use of a familiar terminal emulator to provide control over the hardware simulation. By specifying appropriate settings (such as which terminal emulator and which port) the model can either (a) automatically spawn and connect to the terminal emulator or (b) wait for a connection from the terminal emulator over TCP/IP before beginning simulation. This can provide an IO interface to the model through the UART that allows the simulation of interactive programs.

To allow fast and concurrent input and output, via the terminal emulator, a separate UART thread of execution is used to receive user input characters.

This method can readily be applied to other IO based peripherals such as Ethernet MACs.

There is thus provided a method and apparatus for providing fast software simulation within a hardware description language (HDL) environment.

While the present invention has been described herein with reference to particular embodiments, various changes, and substitutions are possible within the spirit of the present invention. The invention is not be limited to the particular embodiment disclosed, but rather it is defined by the scope of the claims that follow.

The invention claimed is:

1. A method in a host machine for validating a design for a system which comprises a software element and first and second hardware components, the software element being for execution on the second hardware component and the first and second hardware components being operable to interact with one another, the method comprising the steps of:

simulating operation of the first hardware component in a first software simulation system;

simulating the software element and the second hardware component in a second software simulation system;

receiving a dynamically variable synchronization parameter, wherein the dynamically variable synchronization parameter may be varied while simulating the software element and the second hardware component in the second software simulation system;

running the second software simulation system asynchronously with, and ahead of, the first software simulation system, wherein the second software simulation system advances at most by a number of processor clock cycles set in the dynamically variable synchronization parameter before the first software simulation system advances by a clock cycle, the dynamically variable synchronization parameter limiting a maximum number of processor clock periods of the second simulation per period of a reference clock of the host machine;

setting up an inter-process communications protocol connection in the first software simulation system, the inter-process communications protocol being configured to connect to the second software simulation system;

controlling the first software simulation system using the second software simulation system that is running ahead of the first software simulation system, a socket allowing for communication between the second software simulation system and the first software simulation system; and analyzing a result from the first and second software simulation systems and validating the design for the system, wherein the first software simulation system and the second software simulation system are implemented in separate processing threads within the host machine providing more rapid simulation of software instructions in the second software simulation system than the simulation of instructions in the first software simulation system.

2. A method as claimed in claim 1, further comprising:
connecting the second software simulation system to the inter-process communications protocol connection in the first software simulation system;
connecting a software debugger to the second software simulation system; and
controlling the first software simulation system from the software debugger via the second software simulation system using the inter-process communications protocol.

3. A method as claimed in claim 1, further comprising:
connecting a software debugger to the inter-process communications protocol connection; and
controlling the first software simulation system from the software debugger using the inter-process communications protocol.

4. A method as claimed in claim 2 or 3, wherein the inter-process communications protocol is TCP/IP and the connection is a TCP/IP socket.

5. A method as claimed claim 1, wherein the second hardware component includes a processor.

6. A method as claimed in claim 5, wherein the processor is an embedded processor.

7. A method as claimed in claim 1, wherein the second hardware component includes processor peripheral devices.

8. A method as claimed in claim 7, wherein the peripheral devices are embedded.

9. A method as claimed in claim 1, wherein the first software simulation system is implemented using a hardware description language (HDL) simulation environment.

10. A method as claimed in claim 1, wherein the second software simulation system is implemented using a C model.

11. A method as claimed in claim 1, wherein the first hardware component is a programmable logic device.

12. A method in a hardware environment for controlling a simulation of a system using a software debugger, the simulation useful for validating a design of the system, wherein the system comprises a software element and first and second hardware components, the software element being for execution on the second hardware component and the first and second hardware components being operable to interact with one another, the method comprising the steps of:
simulating the first hardware component in a first software simulation in the hardware environment;
simulating the software element and the second hardware component in a second software simulation using a software model embedded within the hardware environment, the first software simulation and the second software simulation being implemented in separate processing threads within the hardware environment;
setting up an inter-process communications protocol connection in the first software simulation, wherein the inter-process communications protocol connects to the second software simulation;
connecting the software debugger to the software model of the second software simulation embedded in the hardware environment;
receiving a variable synchronization parameter, the variable synchronization parameter dynamically variable while simulating the software element and the second hardware component in the second software simulation;
running the second software simulation asynchronously with, and ahead of, the first software simulation, wherein the second software simulation advances at most by a number of processor clock cycles set in the variable synchronization parameter before the first software simulation advances by a clock cycle, the variable synchronization parameter limiting a maximum number of processor clock periods of the second simulation per period of a reference clock of the hardware environment;
controlling the first software simulation of the first hardware component from the software debugger through the second software simulation using the inter-process communications protocol; and
validating the design of the system using the first and second software simulations.

13. A method as claimed in claim 12, further comprising the step of: connecting the software debugger to the inter-process communications protocol connection.

14. A method as claimed in claim 12, wherein the inter-process communications protocol is TCP/IP and the connection is a TCP/IP socket.

15. A method as claimed in claim 12, wherein the step of simulating the second hardware component comprises simulating a processor and one or more peripheral devices with which the one or more processors interact directly.

16. A method as claimed in claim 12, wherein the second hardware component includes embedded processors.

17. A method as claimed in claim 12, wherein the second hardware component includes embedded peripheral devices.

18. A method as claimed in claim 12, wherein the first simulation is implemented using a hardware description language (HDL) simulation environment.

19. A method as claimed in claim 12, wherein the second simulation is implemented using a C model.

20. A method as claimed in claim 12, wherein the first hardware component is a programmable logic device.

21. A method for providing an I/O interface for a simulation model to allow the simulation of interactive programs in a hardware environment for use in system validation, the method comprising:
simulating a software element in a first software simulation using a software model in a first processing thread in the hardware environment;
simulating an embedded input/output device within the simulation model in a second software simulation to produce an input/output device model in a second processing thread, the first software simulation running ahead of the second software simulation, the first and second software simulations being synchronized using a reference clock parameter that limits a maximum number of processor clock periods of the first processing thread per clock period of the second processing thread, wherein the reference clock parameter is dynamically selectable while simulating the embedded input/output device within the simulation model in the second software simulation;
connecting the input/output device model to a terminal emulator using an inter-process communications protocol;

running an interactive program in the terminal emulator to interact with, and transfer information to, the input/output device model;

setting up an inter-process communications protocol connection in the software model, wherein the inter-process communications protocol connects to the input/output device model;

polling the input/output device model for the transferred information using the inter-process communications protocol connection in the software model; and validating a design of the system.

22. A method as claimed in claim 21, the method further comprising:

providing separate processing threads for the embedded input/output device to allow concurrent user inputs and outputs.

23. A method as claimed in claim 21, wherein the inter-process communications protocol is TCP/IP.

24. A method as claimed in claim 21, wherein the input/output device is a UART device.

25. A method as claimed in claim 21, wherein the input/output device is an Ethernet MAC device.

26. The method as claimed in claim 1, wherein the host machine comprises a plurality of processors.

27. The method as claimed in claim 26, the method further comprising:

setting a first software simulation variable, wherein the setting specifies synchronous or asynchronous simulation between the first software simulation system and the second software simulation system.

28. The method as claimed in claim 27, wherein asynchronous simulation uses thread scheduling of the host machine.

29. A method as claimed in claim 1, wherein the controlling the first software simulation system using the second software simulation system comprises the second software simulation system sending control commands to the first software simulation system, to which the first software simulation system responds.

30. A method for simulating a system which comprises a software element and first and second hardware components, the software element being for execution on the second hardware component, and the first and second hardware components being operable to interact with one another, the method comprising:

simulating operation of the first hardware component in a first simulation;

simulating the software element and the second hardware component in a second simulation;

receiving a variable synchronization parameter; wherein the variable synchronization parameter may be dynamically varied while simulating the software element and the second hardware component in the second simulation; and running the second simulation asynchronously with, and ahead of, the first simulation, wherein the second simulation advances at most by a number of processor clock cycles set in the variable synchronization parameter before the first simulation advances by a clock cycle, wherein the first simulation and the second simulation are implemented in separate processing threads.

31. The method of claim 30, wherein the variable synchronization parameter limits a maximum number of processor clock periods of the second simulation per period of a reference clock of the host machine.

32. The method of claim 30, wherein the first and second simulation run asynchronously.

33. The method of claim 30, wherein a number of clock cycles of the first simulation and the second simulation are synchronized with a reference clock.

34. The method of claim 30 further comprising:

performing operations in the first simulation to set up an inter-process communications protocol connection therein;

connecting a software debugger to the communications protocol connection; and controlling the first simulation from the software debugger using the inter-process communications protocol.

35. The method of claim 30, wherein the second hardware component includes embedded processors.

36. A method for controlling a simulation of a system using a software debugger, wherein the system comprises a software element, and first and second hardware components, the software element being for execution on the second hardware component and the first and second hardware components being operable to interact with one another, the method comprising the steps of:

simulating the first hardware component in a first simulation;

simulating the second hardware component in a second simulation;

receiving a variable synchronization parameter, wherein the variable synchronization parameter may be dynamically varied while running the second simulation;

running the second simulation asynchronously with, and ahead of, the first simulation, wherein the second simulation advances at most by a number of processor clock cycles set in the variable synchronization parameter before the first simulation advances by a clock cycle;

performing operations in the first simulation to set up an inter-process communications protocol connection; and controlling the first simulation from the software debugger using the inter-process communications protocol.

37. The method of claim 36, further comprising the step of:

connecting the software debugger to the inter-process communications protocol connection.

38. The method of claim 36, wherein the step of simulating the second hardware component comprises simulating a processor and one or more peripheral devices with which the one or more processors interact directly.

39. The method of claim 36, wherein the first simulation and the second simulation run asynchronously.

40. The method of claim 36, wherein the first simulation and the second simulation are synchronized with a reference clock.

41. The method of claim 36, wherein the second hardware component includes embedded processors.

* * * * *